Oct. 15, 1963 A. J. GRUODIS 3,107,345

ESAKI DIODE MEMORY WITH DIODE COUPLED READOUT

Filed Oct. 5, 1960 2 Sheets-Sheet 1

INVENTOR
ALGIRDAS J. GRUODIS

BY Joseph C. Redmond, Jr.

ATTORNEY

United States Patent Office 3,107,345
Patented Oct. 15, 1963

3,107,345
ESAKI DIODE MEMORY WITH DIODE COUPLED READOUT

Algirdas J. Gruodis, Hyde Park, N.Y., assignor to International Business Machines Corporation, New York, N.Y., a corporation of New York Filed Oct. 5, 1960, Ser. No. 60,732
8 Claims. (Cl. 340—173)

This invention relates to memory matrices and more particularly to matrices employing bistable semiconductor devices.

Memory matrices for computer systems should be rapid in operation, small in physical size, and relatively low in cost. Recently, a bistable semiconductor device has been developed which will permit the design of memory matrices for computer systems that satisfies all of the previously indicated requirements. Such memory matrices, however, may be unduly complicated from a circuit standpoint when non-destructive readout capabilities are required thereof. Moreover, in some installations, additional circuitry is required to suppress unwanted signals in the output of the matrices. Also, it is often necessary to "clock" the connection of voltage sensing equipment to the output of such matrices to ensure the detection of output signals during steady state conditions thereof. As a consequence, memory matrices employing bistable semiconductor devices and adapted for non-destructive readout may be encumbered by complexity and costliness as well as having a reduced operating speed.

A general object of the present invention is an improved memory matrix adapted for non-destructive readout and rapid operation.

One object is a simplified memory matrix employing bistable semiconductor devices and having an output substantially free of any unwanted signals.

Another object is a compact memory matrix employing bistable semiconductor devices for supplying output signals to voltage sensing equipment without clocking thereof.

Still another object is an inexpensive memory matrix having relatively simple readout circuitry.

These objects are accomplished in accordance with the present invention, one illustrative embodiment of which comprises an *m* number of X lines, and an *n* number of Y lines forming *mn* crosspoints, *m* and *n* being any integer. At each crosspoint a bistable semiconductor device having "0" and "1" stable states and a series resistor are connected between the conductors of the crosspoint. Also an asymmetrical semiconductor device is suitably connected to each bistable semiconductor device and resistor to receive outputs therefrom. Corresponding asymmetrical devices in the Y lines or columns of the matrix are connected together to form a plurality of output circuits. A readout circuit includes means for biasing the asymmetrical semiconductor devices in each output circuit to a threshold and suppressing unwanted signals when output signals occur from any crosspoint. At least two signal sources of suitable magnitude and polarity are employed to switch selectively the bistable semiconductor devices at any crosspoint from the "0" to the "1" state, or vice versa. A signal source is also connected to one of the two sets of matrix lines to clear or non-destructively readout the signal state of any bistable semiconducting device located at a crosspoint.

One of the features of the present invention is the connection of an asymmetrical semiconductor device to each crosspoint to permit non-destructive readout of the information stored at that crosspoint.

Another feature is a readout network for providing a threshold bias for each of the asymmetrical devices located in an output line and suppressing unwanted signals when an output occurs from any crosspoint.

Still another feature is a memory matrix wherein selective writing is accomplished by coincident application on X and Y lines of write-in signals and selective non-destructive readout is accomplished by the application of pulses of suitable magnitude and polarity to one of the two sets of lines comprising the matrix.

The foregoing and other objects and features will be apparent from the following more particular description of a preferred embodiment of the invention, as illustrated in the accompanying drawing, wherein.

Figures 3A, 3B, 3C:
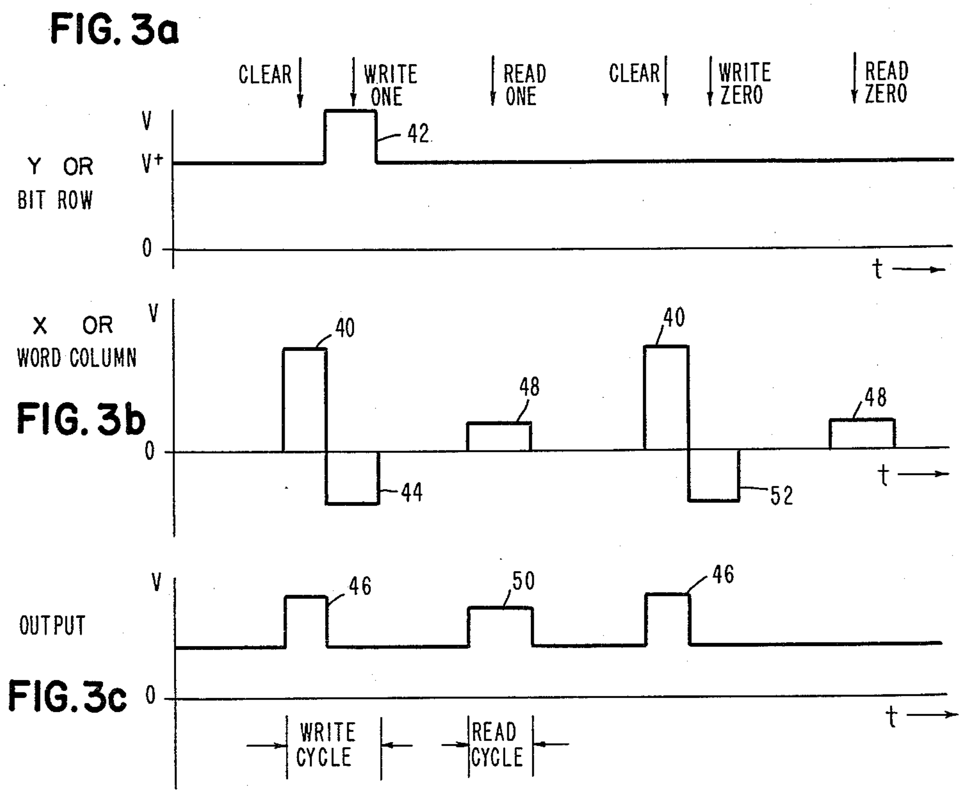

FIGS. 3*a* through 3*c* are voltage-time diagrams of writein and readout pulse forms supplied to the X and Y lines and the waveforms appearing in the output of the present invention.

Figure 1:
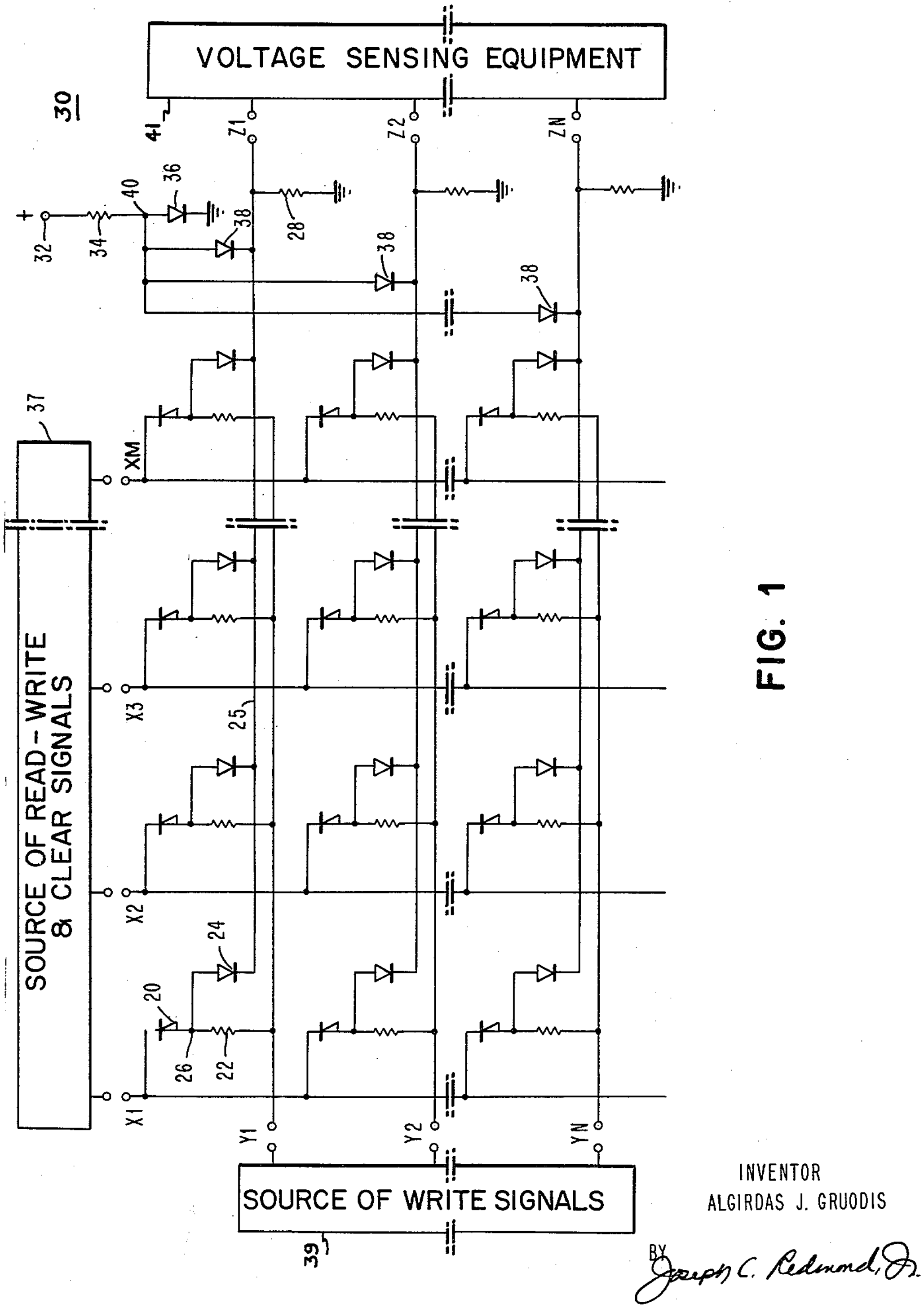
FIG. 1 is a two-dimensional schematic representation of one embodiment of the present invention.

Referring to FIG. 1, one illustrative embodiment of the present invention comprises an *m* number of X or vertical lines and an *n* number of Y or horizontal lines, forming *mn* crosspoints, *m* and *n* being any integer. At each crosspoint, a bistable semiconductor device 20, to be described in more detail hereinafter, and a series resistor 22 are connected between the conductors of the crosspoint. Also, an asymmetrical semiconductor device 24, typically a conventional PN junction diode, is connected to common junction 26 between the diode 20 and the resistor 22. The diodes 20 and 24 at each crosspoint are in opposed conducting relation for reasons more apparent hereinafter. The diodes 24 in row $Y_1$ are all multipled together through a common lead 25 to form an output circuit $Z_1$. Similarly, the diodes 24 of rows $Y_2 \ldots Y_n$ are all multipled together to form output circuits $Z_2 \ldots Z_n$, respectively.

Connected between each output line and a reference point, typically ground, is a load 28. Also connected to each output line is a readout network 30, which includes a power source 32 of suitable magnitude and polarity; a resistor 34 connected to a reference point, typically ground, through an asymmetrical semiconductor device 36, typically a PN junction diode and asymmetrical semiconductor device 38, typically PN junction diode, connected between each output circuit and a common junction 40, which is between the resistor 34 and the diode 36. All of the diodes 36 and 38 in the readout network are connected so as to be in the forward biased or conducting direction, for reasons which will become more apparent hereinafter.

A source 37 of read, write and clear signals is coupled to the X lines and a source 39 of write signals is coupled to the Y lines. The signals, when properly combined permit the selective writing, reading and clearing of information at any crosspoint. To complete the circuit of the matrix, the X lines are connected to a reference potential, typically ground (not shown) whereas the Y lines are biased to a voltage V+ by a suitable source (not shown). The output lines $Z_1 \ldots Z_n$ are connected to any conventional voltage sensing amplifiers 41 for detecting output signals from any crosspoint.

The bistable semiconductor device employed at each crosspoint, exists in the art in several forms. Recently, an eminently satisfactory diode has been developed which permits the storage of different quantities of energy at either of two stable states. The new diode is described in an article entitled: "New Phenomenon in Narrow Germanium PN Junctions," Physical Review, vol. 109, pages 603–604, 1958, by L. Esaki and is often referred to as a tunnel or Esaki diode. The tunnel diode is a preferred form of bistable semiconductor device to be employed in the present invention and will be the element referred to in the remaining paragraphs of the specification. It should be understood, of course, that other forms of bistable semiconductor devices may be employed in the practice of the present invention with satisfactory results.

The tunnel diode 20 has a negative resistance characteristic which is well known to a worker skilled in the art. When the diode is connected in series with the resistor 22, the switching characteristic between the lines of each crosspoint is that shown in FIG. 2. As shown there the diode at each crosspoint has two stable operating conditions "0" or "1" along a single voltage line which in the present instance is the biasing voltage V+ applied to the Y lines. Such a characteristic permits switching of the crosspoint from one stable state to the other simply by voltage pulsing. For example: if it is assumed that a diode is initially in the "0" state, the diode may be switched to the "1" state by applying voltage of sufficient amplitude to the crosspoint so that the voltage exceeds the knee in the forward portion of the characteristic. The voltage pulse may be of short duration, for once the voltage level of this knee is exceeded, the diode almost instantaneously switches to the other stable state, "1." Conversely, clearing is accomplished simply by applying a voltage pulse to the crosspoint in the opposite direction to the biasing voltage V+, and of a magnitude to exceed in a negative direction the reverse knee of the characteristic. Whereupon, the diode almost instantaneously returns to the "0" state.

To adapt the present invention for non-destructive readout of the information stored at the crosspoint, the readout network 30 applies threshold voltage to each of the diodes 24 through the diodes 38, the polarity of the threshold voltage being selected normally to reverse bias the diode 24. The magnitude of the threshold voltage is substantially equal to the voltage at the junction 26 when a tunnel diode switches to the high voltage, low current or "1" state. Thus, it can be seen that no output signals will pass through the diodes 24 until the voltage at the junction 26 exceeds the threshold voltage of the diode. Readout pulses supplied by the source 37 to the X lines will raise the voltage at the junction 26 above the threshold voltage when the tunnel diode is in the "1" state. Accordingly, a signal will appear in the output circuit from the crosspoint. When the diode is in the low voltage, high current or "0" state, however, the magnitude of the readout pulse is such that the threshold voltage of the diode 24 will not be exceeded and no signal will appear in the output. The magnitude of the readout pulse is further selected to prevent the tunnel diode resetting from the "1" state to the "0" state as will be explained in more detail hereinafter.

The readout network 30 is also adapted to prevent unwanted signals from appearing on the output lines. The unwanted signals originate from the voltage changing across the diodes 38 when one of the diodes 24 conducts. It will be appreciated that when one of the diodes 24 conducts the voltage between the tie line 25 and ground increases to the point where the diode 38 connected to the line is cut off. As a consequence, the voltage at the junction 40 will increase which could drive the conducting diodes 38 into further conduction producing the effect of a pulse in the other output circuits. To prevent the voltage at the junction 40 from simultaneously rising when one of the diodes 24 conducts, the resistor 34 is chosen to maintain a constant voltage drop across the diode 36, regardless of the conductive state of the diodes 38. Another arrangement for maintaining a constant voltage at the node 40 would be to connect the node to a regulated power supply of proper magnitude and polarity.

An understanding of the operation of the present invention will be facilitated by referring to the waveforms shown in FIGS. 3*a* through 3*c* which indicate the signals that may be applied to any crosspoint and the signals that appear on the output line associated therewith. Considering the crosspoint $X_1$—$Y_1$, for example, and assuming the diode 20 at the crosspoint is being operated along the voltage line V+ (see FIG. 2) the first step in the operation of the invention is the application of a clear pulse 40 (see FIG. 3*b*) to the $X_1$ line. The clear pulse drives the tunnel diode beyond the knee in the negative portion of the voltage-current characteristic thereof (see FIG. 2) causing the diode to switch to the "0" state in the event that the diode is in the "1" state. If the diode is in the "0" state, the setting is not affected by the clear pulse. The application of the clear pulse to the $X_1$ line also raises the voltage at the junction 26 above the threshold voltage of the diode 24 which is driven into conduction causing an output pulse 46 to appear in the output line (see FIG. 3*c*). On release of the clear pulse the matrix is ready for selective storage and subsequent non-destructive readout of the information stored therein.

To store a "1" at the crosspoint a positive pulse 42 is applied to the $Y_1$ line and a negative pulse 44 is applied to the $X_1$ (see FIGS. 3*a* and 3*b* respectively), the magnitudes of the pulses being sufficient to drive the tunnel diode beyond the forward knee portion of the voltage-current characteristic (see FIG. 2) thereby causing the diode to shift from the "0" state to the "1" state. As indicated in FIG. 3*c*, no pulse appears on the output line since, as previously mentioned, the threshold pulse of the diode is substantially equal to that of the diode 20 in the "1" state.

Figure 2:
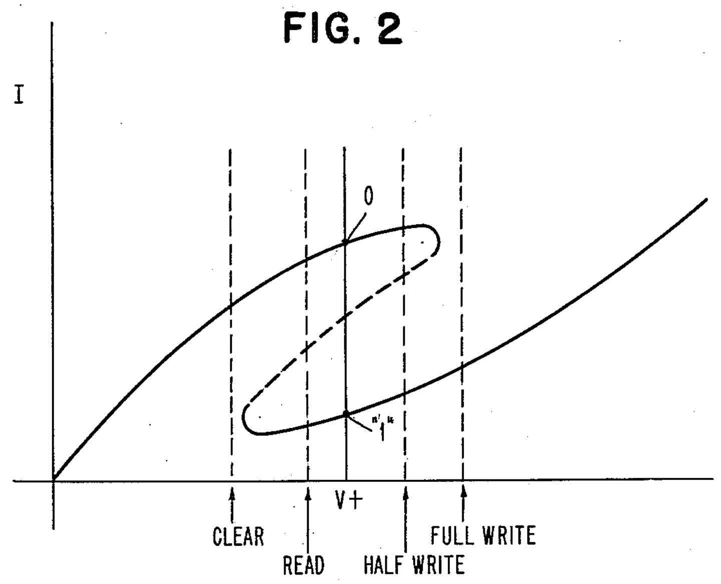
FIG. 2 is a voltage-current characteristic diagram of a bistable semiconductor device employed in the present invention.

Having stored information at the crosspoint, non-destructive readout is accomplished by applying a readout pulse 48 to the X lines as shown in FIG. 3*b*. The magnitude of the pulse is selected so as not to drive the tunnel diode beyond the reverse knee portion of the voltage-current characteristic curve thereof, as shown in FIG. 2, and reset the diode. As a consequence, the diode returns to the "1" stable state after release of the input pulse. The magnitude of the pulse is further selected so that when combined with the tunnel diode voltage the threshold voltage of the diode 24 will be exceeded causing the latter element to conduct. A pulse signal 50 appears on the output line, as indicated in FIG. 3*c*, from the conduction of the diode 24. The output pulse 50 is substantially equal in duration and corresponds in shape to that of the readout pulse 48, since the voltage across the tunnel diode remains substantially constant and little or no output current is shunted off by the other reversed-biased diodes connected to the output line.

The steady state condition of the output pulse 50 is achieved simultaneously with the application of the read pulse. As a result, no transient conditions appear in the output signal and the voltage sensing equipment 41 (see FIG. 1) associated with the output line need not be timed or clocked for connection to the line as in the case of many prior art devices. Such prior art matrices have transient output signals which extend for a relatively long interval, during which time voltage sensing of the line must be delayed since any output signals would not be truly indicative of the information stored at the crosspoint. It is believed apparent, therefore, that the present invention permits faster readout than prior art devices requiring "clock" arrangements for connecting voltage sensing equipment to the matrix.

Returning now momentarily to FIG. 1, the diode 38 associated with the output line having an output signal thereon is adapted to be turned off by the voltage at the junction 26 with the result that the only current appearing in the load resistor 28 is that originating from the crosspoint. It should be noted that the load resistor should be selected so as not to overload the tunnel diode during readout otherwise the diode will be reset and non-destructive readout of the crosspoint will not occur. The voltage at the junction 40 remains constant as previously explained. Hence, the voltage in the other output circuits remains substantially constant and a no false signals appear in the other output lines by the diodes 38 of those circuits being driven further into conduction from an increase in voltage at the junction 40.

In the event that it is desired to write a "0" at the selected $X_1$—$Y_1$ selected crosspoint, the clear pulse 40, as shown in FIG. 3*d*, is first applied to the $X_1$ line. As shown in FIG. 2 the voltage across the tunnel diode is reduced below the reverse knee of the voltage-current characteristic thereof and the diode assumes the operating condition for the "0." Again, the clear pulse causes the output pulse 46 to appear in the output line stable state as shown in FIG. 3*c*, for the reasons previously described. With the diode 20 at the selected crosspoint in the "0" state, the application of a negative pulse 52 to the X line (see FIG. 3*b*) drives the voltage across the tunnel diode to the forward knee of the voltage current characteristic thereof (see FIG. 2) without exceeding the knee portion of the curve. The diode remains in the "0" state and no signal appears in the output circuit (see FIG. 3*c*). For the "0" state, the voltage of the tunnel diode does not exceed the threshold voltage of the diode 24.

Application of a readout pulse to the $X_1$ line also does not produce a pulse in the output line as indicated in FIG. 3*c*. The readout pulse lowers the voltage across the tunnel diode and drives the operating point away from the knee of the crosspoint (see FIG. 2). The combination of the read pulse voltage and the tunnel diode voltage does not exceed the threshold voltage of the diode 24. Hence, no pulse appears in the output circuit. The absence of a pulse in the output circuit when readout occurs is indicative of a "0" stored at the crosspoint. On release of the readout pulse the tunnel diode returns to the operating condition for the "0" state.

While the present invention has been described for the crosspoint $X_1$—$Y_1$ it is believed apparent that information may be stored, cleared and non-destructively read at any crosspoint in the matrix by the application of the same pulses to the conductors of the desired crosspoint as described for the crosspoint $X_1$—$Y_1$. The crosspoint $X_1$—$Y_1$ has been selected arbitrarily for reasons of convenience only in the description of the invention.

Although the present invention has shown a tunnel diode and a conventional diode in combination with a single resistor it is believed apparent that the diodes may be employed in combination with more than one resistor for providing the bias and switching pulses to the tunnel diodes. For example, a conventional Kirchhoff adder circuit could be connected to the tunnel diode for biasing and switching and the output circuit could remain the same as that already disclosed.

Hence, the present invention has disclosed an extremely simple combination of a bistable semiconductor device, an asymmetrical semiconductor diode and a resistor for non-destructive readout of a memory device. A diode coupled readout circuit renders the matrix practically free of any unwanted signals in the output circuit. All of the components of the matrix may be made small in physical size, with a result that memory matrices of relatively large capacity may be developed which are substantially reduced in volume. Moreover, the cost of each of the elements and the combination thereof is suitable for mass production manufacture which renders the memory matrix relatively low in cost.

While the invention has been particularly shown and described with reference to a preferred embodiment thereof, it will be understood by those skilled in the art that various changes in form and details may be made therein without departing from the spirit and scope of the invention.

What is claimed is:

1. In a memory matrix comprising *m* number of "X" lines and *n* number of "Y" lines forming *mn* crosspoints, a two terminal bistable semiconductor device and a series resistor connecting the "X" and "Y" lines at each crosspoint, said bistable device having two positive resistance regions separated by a negative resistance region, means for operating the bistable device on either of the two positive resistance regions, and at least one reverse-biased asymmetrical semiconductor device connected to the bistable semiconductor device and the series resistor at each crosspoint, said asymmetrical device being in series opposed relation with the bistable device.

2. In a memory matrix comprising *m* number of "X" lines and *n* number of "Y" lines forming *mn* crosspoints, a two terminal bistable semiconductor device and a series resistor connecting the "X" and "Y" lines at each crosspoint, said bistable device having two positive resistance regions separated by a negative resistance region, means for operating the bistable device on either of the two positive resistance regions, an asymmetrical semiconductor device connected to each crosspoint through the common junction of the bistable semiconductor device and the resistor associated therewith, said asymmetrical device being in series opposed relation with the bistable device, the asymmetrical semiconductor devices connected to the crosspoints along the same Y line being coupled together to form an output circuit, and a readout network for reverse biasing each asymmetrical semiconductor device to a threshold.

3. In a memory matrix according to claim 2, wherein the readout network comprises an asymmetrical semiconductor device connected to each output circuit and means for biasing normally each of said semiconductor devices into the conducting direction until an output occurs from the matrices whereupon the semiconductor device associated with the output circuit having an output signal thereon is biased into the non-conducting state.

4. In a memory matrix according to claim 3, wherein the means for biasing each asymmetrical semiconductor device connected to an output circuit comprises a voltage source of suitable polarity and magnitude; and means for maintaining the voltage across each semiconductor device regardless of the load condition in the output circuits.

5. A memory matrix comprising a plurality of storage registers, each including a two terminal bistable semiconductor device, said bistable device having two positive resistance regions separated by a negative resistance region, means for operating the bistable device on either of the two positive resistance regions, a resistor and a reverse-biased asymmetrical semiconductor device, said asymmetrical device being in series opposed relation with the bistable device, a first plurality of input lines connected to the bistable semiconductor device in each of the registers, an output circuit connected to the asymmetrical semiconductor devices located in registers on the same line in the second plurality of input lines, a first signal means coupled to the first and second input lines for storing information selectively in each of the storage registers, a second signal means for applying readout signals to at least one of the first plurality of input lines to readout non-destructively information stored in a selected storage register, and means for preventing unwanted signals from appearing on an output line when an output occurs thereon.

6. A memory matrix comprising a plurality of storage registers, each including a two terminal bistable semiconductor device having at least two positive resistance regions separated by a negative resistance region, a resistor and an asymmetrical semiconductor device, said asymmetrical device being in series opposed relation with the bistable device, said bistable semiconductor device having a "0" or a "1" operating state on either positive resistance region of the device, a first plurality of input lines coupled to the bistable semiconductor device in each of the registers, a second plurality of input lines coupled to the resistors in each of the registers, an output circuit connected to the asymmetrical semiconductor device located in the registers coupled to the same line in the second plurality of input lines, means for biasing reversely each asymmetrical semiconductor device to a threshold, means for biasing each bistable semiconductor device into one of the two operating states, a first signal means coupled to the first and second input lines for storing information selectively in each of the storage registers, a second signal means for applying readout signals to at least one of the first plurality of input lines, said readout signals having a magnitude and polarity to exceed the threshold voltage of the asymmetrical semiconductor device when the bistable semiconductor is in the "1" state only to thereby readout non-destructively the information stored in a selected storage register, and means for preventing unwanted signals from appearing on the output line when an output occurs thereon.

7. The memory matrix as defined in claim 6 wherein the magnitude and the polarity of the readout signals are further limited to prevent reset of the bistable semiconductor when applied to the first plurality of input lines.

8. A memory comprising an $m$ number of X lines and an $n$ number of Y lines forming an $mn$ number of crosspoints, a two terminal bistable semiconductor device and a series connected resistor coupled between the X and Y lines of each crosspoint, said series resistor being adapted to modify the characteristics of the bistable device so that operation is achieved with signals of equal magnitude, said bistable device at each crosspoint having a pair of positive resistance regions separated by a negative resistance region, means for operating the bistable device on either of the positive resistance regions, an asymmetrically conducting device connected to the resistor and bistable device at each crosspoint, an output circuit connected to those asymmetrical devices coupled to the same X line, means for supplying a potential to the output circuits to reverse bias the asymmetrical devices connected thereto, and means for maintaining a constant potential on the output circuit so that unwanted signals do not appear on the output lines due to one or more asymmetrical devices conducting.

References Cited in the file of this patent

UNITED STATES PATENTS

| | | |
|---|---|---|
| 2,907,000 | Lawrence | Sept. 29, 1959 |
| 2,975,377 | Price et al. | Mar. 14, 1961 |
| 2,986,724 | Jaeger | May 30, 1961 |